United States Patent [19]

Allsop et al.

[11] Patent Number: 5,411,280
[45] Date of Patent: May 2, 1995

[54] BICYCLE BRAKE AND DERAILLEUR MOUNT

[75] Inventors: James D. Allsop; Michael G. Allsop, both of Bellingham, Wash.

[73] Assignee: Softride, Inc., Bellingham, Wash.

[21] Appl. No.: 157,616

[22] Filed: Nov. 24, 1993

Related U.S. Application Data

[60] Division of Ser. No. 947,274, Sep. 18, 1992, which is a continuation-in-part of Ser. No. 873,878, Apr. 22, 1992, Pat. No. 5,240,268, which is a continuation of Ser. No. 589,771, Sep. 28, 1990, abandoned, which is a continuation-in-part of Ser. No. 521,130, May 9, 1990, Pat. No. 5,029,888, which is a continuation of Ser. No. 333,891, Apr. 7, 1989, Pat. No. 4,934,724.

[51] Int. Cl.⁶ .................. B62K 19/02; B62K 19/38; B62K 19/40
[52] U.S. Cl. .................. 280/281.1; 188/24.22
[58] Field of Search .................. 280/281.1, 259, 288.2; 188/24.22; 474/80, 81, 140

[56] References Cited

U.S. PATENT DOCUMENTS

| D. 45,219 | 2/1914 | Allen . | |
|---|---|---|---|
| 631,282 | 8/1899 | Dikeman . | |
| 1,580,414 | 4/1926 | Cozzolino et al. . | |
| 2,244,709 | 6/1941 | Kinzel . | |
| 2,493,037 | 1/1950 | Simon . | |
| 2,854,249 | 9/1958 | Jaulmes . | |
| 3,121,575 | 2/1964 | Bourgi . | |
| 4,613,146 | 9/1986 | Sharp et al. . | |
| 4,768,798 | 9/1988 | Reed et al. | 280/281.1 |
| 4,850,607 | 7/1989 | Trimble . | |
| 4,921,267 | 5/1990 | Kirk | 280/281.1 |
| 4,934,724 | 6/1990 | Allsop et al. | 280/281.1 |
| 5,029,888 | 7/1991 | Allsop et al. | 280/281.1 |
| 5,240,268 | 8/1993 | Allsop et al. | 280/281.1 |

FOREIGN PATENT DOCUMENTS

| 336181 | 4/1921 | Germany . |
|---|---|---|
| 4101998 | 7/1992 | Germany . |
| 2-286486 | 11/1990 | Japan . |
| 352342 | 7/1931 | United Kingdom . |

OTHER PUBLICATIONS

Zipp 2001 material, (four-page brochure and 4 photographs), 1991.

Primary Examiner—Mitchell J. Hill
Attorney, Agent, or Firm—Christensen, O'Connor, Johnson & Kindness

[57] ABSTRACT

A bicycle (10) with a frame (12) formed out of composite material is disclosed. The frame of this bicycle includes a head unit or module (34) that is attached to two body units (36, 38). The head unit and body unit are formed out of a urethane core and can be formed of stiffened fiberglass, carbon fibers, or like nonmetallic material. The head unit and body units are formed with bores (78, 81, 83, 90) in which sleeves and cables are seated to accommodate the installation of the other components of the bicycle to the frame. The body is further formed with a set of rearwardly extending members that form the chain stays (22) of the bicycle. Dropouts (104) are seated in recesses formed in the chain stays. The bicycle includes a from derailleur/rear brake assembly (30) with a front derailleur (134) that can be both selectively moved up and down and selectively pivoted along a lateral axis of the bicycle. By selecting an appropriately sized head unit, the frame of the bicycle can built to a specific size. Components of specific dimension can then be attached to the frame to facilitate the construction of a bicycle of this invention so that it is built for a cyclist of a specific size.

15 Claims, 8 Drawing Sheets

BICYCLE BRAKE AND DERAILLEUR MOUNT

RELATIONSHIP TO OTHER APPLICATIONS

This application is a divisional of application Ser. No. 07/947,274, filed Sep. 18, 1992, which is a continuation-in-part of application Ser. No. 07/873,878 filed Apr. 22, 1992, now U.S. Pat. No. 5,240,268. That application is a continuation of application Ser. No. 07/589,771 filed Sep. 28, 1990, now abandoned. That application was a continuation-in-part of application Ser. No. 07/521,130 filed May 9, 1990, now U.S. Pat. No. 5,029,888. That application was a continuation of application Ser. No. 07/333,891 filed Apr. 7, 1989, now U.S. Pat. No. 4,934,724.

FIELD OF THE INVENTION

This invention relates generally to bicycles and, more particularly, to a bicycle with a modular composite frame that can be readily constructed for cyclists of different sizes and statures.

BACKGROUND OF THE INVENTION

Bicycles have proven to be very efficient vehicles for converting human energy into mechanical energy in order to produce self-propelled motion. Most bicycles include a metallic frame that comprises a set of tubes that are welded together. The wheels, the drive assembly, and the steering assembly are all mounted to the frame to complete the bicycle. Recently, there have been significant efforts to substitute frames formed out of composite material for frames formed out of metal. An advantage of a composite frame is that it offers as much structural strength as a metal frame and weighs significantly less. Moreover, composite frames, unlike conventional frames, do not rust and corrode when exposed to the elements. These advantages are expected to help make composite-frame bicycles very popular for use as mountain bicycles and other types of bicycles where it is desirable to have a frame with significant mechanical strength and that can withstand the rigors of contact with water, mud, rocks, and other wearing material.

Composite bicycle frames are typically formed out of nonmetallic material that is shaped in a mold. Owing to the expenses associated with forming the molds, it has proven very expensive to provide the differently sized composite frames required to build bicycles for large numbers of cyclists who are themselves of different statures. Moreover, in order to satisfy the bicycling population's demand for differently sized bicycles, the retailer, the distributor, and/or the manufacturer are forced to have a large number of already assembled frames in inventory. At a minimum, this requires a large amount of storage space and at worst may require those involved in the manufacturing and sale of bicycles to tie up large amounts of capitol in inventory for which there may seldom be a need. Some bicycle manufactures have attempted to overcome this problem by providing composite frames with metal fittings and fixtures that can be adjustably set to accommodate the needs of differently sized cyclists. However, this solution has not proven to be wholly satisfactory. The addition of these metal components increases the weight of the assembled bicycle so as to detract from the advantages of the composite frame.

SUMMARY OF THE INVENTION

This invention relates to a bicycle with a composite frame that can readily be dimensioned for use by a cyclist of a particular size and shape. The bicycle of this invention includes a composite frame that is formed out of a number of different units or modules that are mated together to form the whole frame. The bicycle includes a number of components, including composite body and head units, that are sized to form a frame that is custom shaped for a specific-sized cyclist.

The bicycle of this invention includes three composite units, two body units that are symmetric with respect to each other and a head unit that can be joined to the body units. In one version of the invention each body unit is formed with a urethane core and outer skin formed of a hardened material such as cured fiberglass or a stiffened graphite fiber weave. Each body unit is formed with one of the chain stays of the bicycle. When the body units are mated together, the adjoining skins form one or more centered upright ribs that extend lengthwise in the central vertical plane of the frame. The rear wheel of the bicycle is mounted to a pair of dropouts, each of which is removably secured in a recess formed in one of the chain stays. The head unit is seated in the top of the body units. Mounted in the head unit is a head tube to which the front fork and handlebar assemblies of the bicycle are attached. A shock-absorbing seat support is attached to the top of the head unit adjacent the head tube. The seat support extends rearward from the head unit and provides a beam to which a bicycle seat is attached over the rear wheel.

Once the body units of this bicycle are mated together, a head unit of a desired size is joined to the body units to provide the basic frame of the bicycle with a selected height. Specifically sized dropouts may be fitted to the chain stays of the body unit to accommodate the placement of a specifically sized wheel. The bicycle is also provided with a combined front derailleur/rear brake assembly that can be positioned for differently sized crank assemblies and differently sized wheels that may be mounted to the bicycle. The seat support allows the selective forward-and-rearward positioning of the seat. The adjustability of these components makes it possible to construct a bicycle formed from a generic set of composite units or modules so that it is specifically shaped for the cyclist for which it is intended. Thus, the bicycle of this invention eliminates the need to maintain a large number of composite frames or to have to provide those frames with a large number of metal fixtures and fittings.

Still another feature of the bicycle of the invention is that, since it does not have either a top tube or a seat post tube, it is aerodynamically more efficient than other bicycles. While this bicycle is aerodynamically more efficient than other bicycles, since it is formed out of relatively strong composite materials, it is structurally as strong as, if not stronger than, other bicycles. The mechanical strength of this bicycle is enhanced by the fact that, when the body units are mated together, the inside skins of the units form one or more ribs that extend lengthwise of the frame.

The combined front derailleur/rear brake assembly includes a base section and a mount projection. The base section is arranged and configured for attachment to the top of the body unit adjacent the at least one chain stay. The mount projection is attached to the base section, the mount projection having a means for attaching the front derailleur. The mount projection also has means for attaching the rear brake assembly adjacent the front derailleur.

The preferred embodiment of the front derailleur/rear brake assembly includes a locking fin projecting downwardly from the base section to be inserted within the body unit for stabilizing and holding the base section and the mount projection in position. The mount projection also includes a fin extending upwardly to be aligned substantially within a vertical plane defined by the frame of the bicycle. A bracket is movably coupled to the fin for attachment of the front derailleur assembly. The bracket includes a first faceplate coupled to the fin and a second faceplate attached to the first faceplate. The second faceplate is arranged and configured for attaching the front derailleur and includes an elongated slot for adjustable attachment of the front derailleur.

The invention may also be defined as a bicycle including a frame, a rear brake, and a front derailleur. The frame includes a center section, a bottom bracket affixed to the bottom beam, and at least one chain stay attached to the bottom beam. The bottom beam has a top side and a bottom side. The rear brake is attached to the top side of the center section adjacent the at least one chain stay. The front derailleur is attached to the top side of said center section of the frame adjacent the brake and above the bottom bracket.

BRIEF DESCRIPTION OF THE DRAWINGS

The invention will be pointed out with particularity in the appended claims. The above and further advantages of the invention may be better understood by reference to the following detailed description, taken in conjunction with the accompanying drawings, in which:

DETAILED DESCRIPTION OF THE PREFERRED EMBODIMENT

Figure 1:
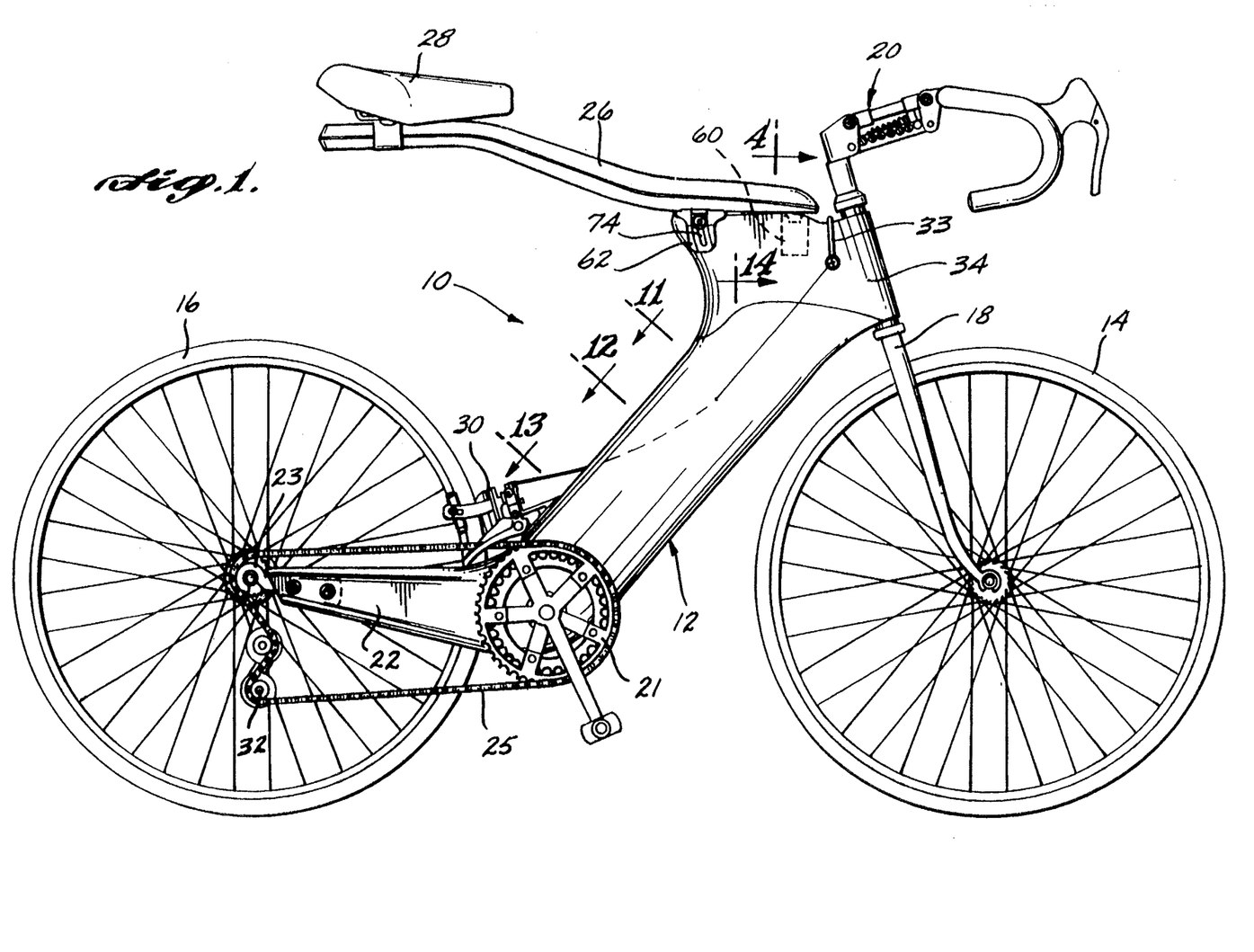
FIG. 1 is a side view of a bicycle having a frame in accordance with this invention.

FIG. 1 illustrates a bicycle 10 having a frame 12 in accordance with this invention. The bicycle frame 12 is formed out of composite material to which the front wheel 14 and rear wheel 16 are attached. The front wheel 14 is attached to the frame by a front fork assembly 18, which is rotatably carried by the frame. The orientation of the front fork assembly 18 and front wheel 14 is controlled by manipulation of a top handlebar assembly 20. The rear wheel 16 is attached to a pair of chain stays 22, which are part of the frame 12. The rear wheel 16 is powered by a drive train that includes a crank assembly 21, which is rotatably mounted to the bottom of the frame 12, a free gear 23 that rotates with the rear wheel 16, and a chain 25 that connects the crank assembly to the free gear.

A shock-absorbing seat support 26 is attached to the top of the frame 12 adjacent and rearward of the handlebar assembly 20. The seat support 26 extends rearward and slightly upward from the top of the frame 12. A bicycle seat 28 is secured to the seat support 26 above the rear wheel 16. A combined front derailleur and rear brake assembly 30 is mounted to the frame 12 above the crank assembly 21. A rear derailleur 32 is attached to the rear wheel 16. The position of the derailleurs is established by a set of shifters 33 attached to the frame 12 adjacent the front fork assembly 18.

Figure 2:
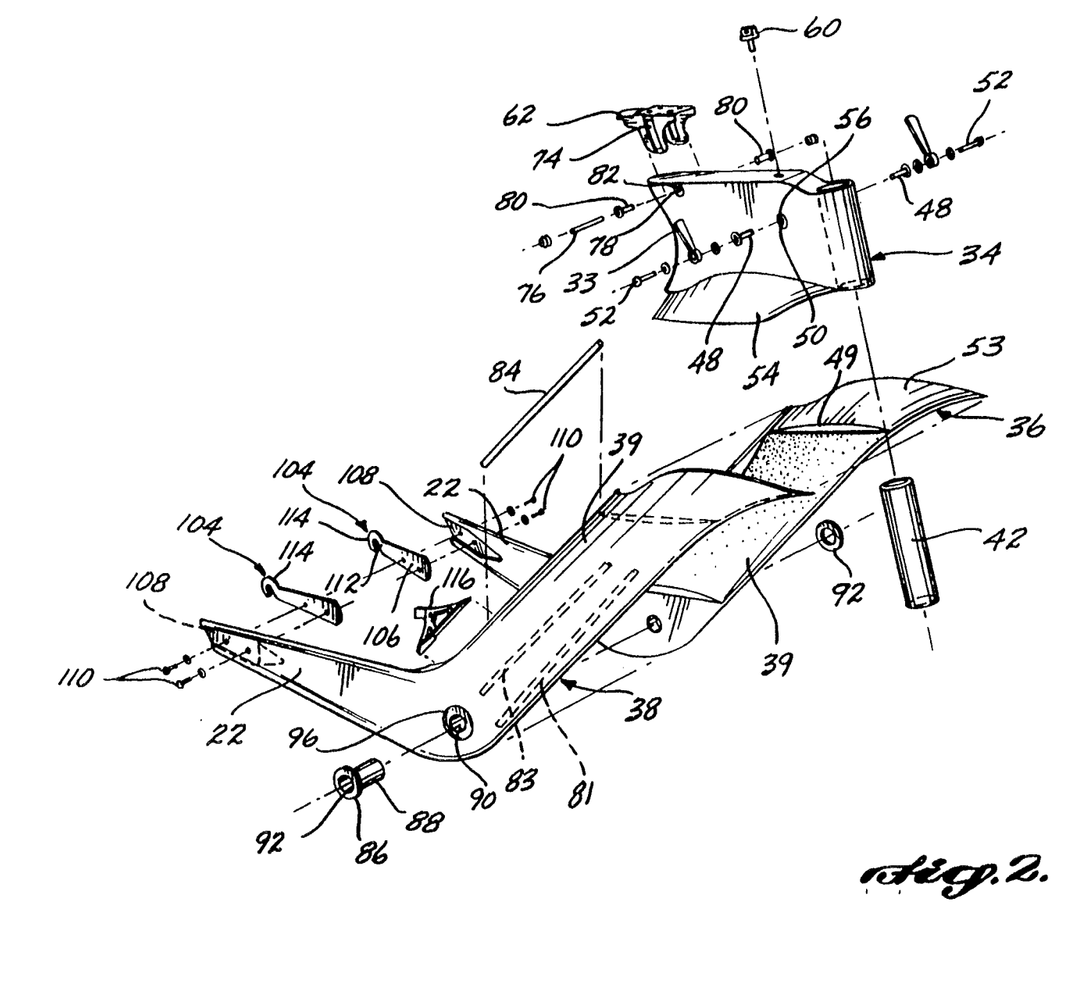
FIG. 2 is an exploded perspective of the frame of this invention.
Figure 3:
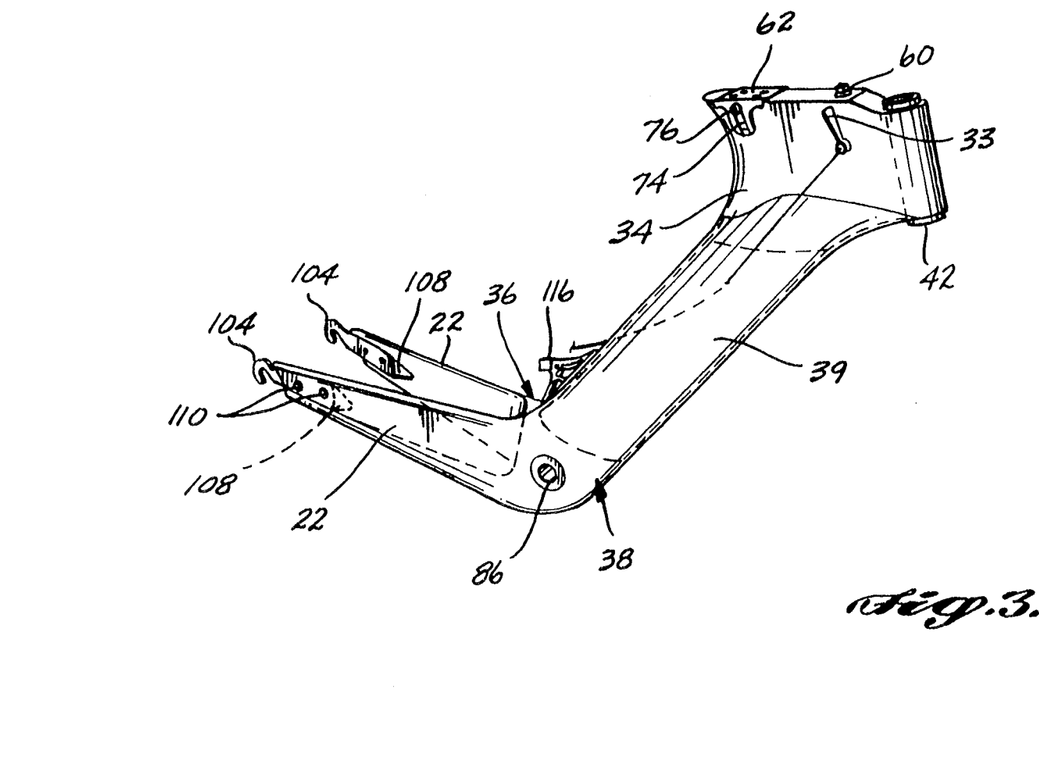
FIG. 3 is a perspective view corresponding to FIG. 2 but with parts assembled.

As depicted by FIGS. 2 and 3, the frame of the bicycle is actually formed out of three distinct units, a head unit 34, a left body unit 36, and a right body unit 38. Each frame unit 34–38 is formed out of urethane foam core and a skin of fiber glass, carbon fiber, Kevlar, or other rigid, nonmetallic material that is resistant to corrosion. The body units 36 and 38 are each formed with a generally diagonally extending center section 39. Each body unit 36 and 38 is further formed with a bottom leg that extends horizontally from the associated center section and diverges rearward and outward from the bottom leg of the other body unit. The legs function as the chain stays 22 of the bicycle which support the rear wheel. The head unit 34 is disposed on top of the body units 36 and 38 and has a generally rectangular shape. As will be discussed hereinafter, the frame is assembled by initially mating body units 36 and 38 together and then seating the head unit 34 in the top of the body units.

The head unit 34 is provided with a head tube 42 in which the upper end, the quill, of the front fork assembly is journaled. The head tube 42 is dimensioned to extend out of the top and bottom of the head unit 34. In some preferred versions of the invention the head tube 42 is molded in place when the foam core of the head unit is formed. In other versions of the invention, after the foam core is formed, a bore is drilled and the head tube 42 is glue secured in position. In either version, when the outer skin is applied over the core, the skin is applied around the portions of the tube that extend out of the core. A handlebar assembly and, more particularly, a shock-absorbing clamp for a handlebar assembly that can be used to control the orientation of the front fork assembly and the front wheel are disclosed in PCT application No. PCT/US92/00781, which was published as WIPO Document No. WO 92/13749 on 20 Aug. 92, and is incorporated herein by reference. The shifters 33 are secured to the head unit 34 adjacent and slightly rearward of the head tube 42 by a pair of sleeves 48. The sleeves 48 are secured in a bore 50 that extends longitudinally through the skin and core of the head unit. The adjacent ends of the sleeves 48 are provided with complementary threading or other fastening means so that they can be secured together. Threaded fasteners 52, which extend through the shifter components and are coupled into the sleeves 48, secure the shifters 33 to the head unit. The outer skin of the head unit is formed with recesses 56 adjacent the bore 50 in which the flanged outer ends of the sleeves as well as some of the shifter components are seated.

Figure 4:
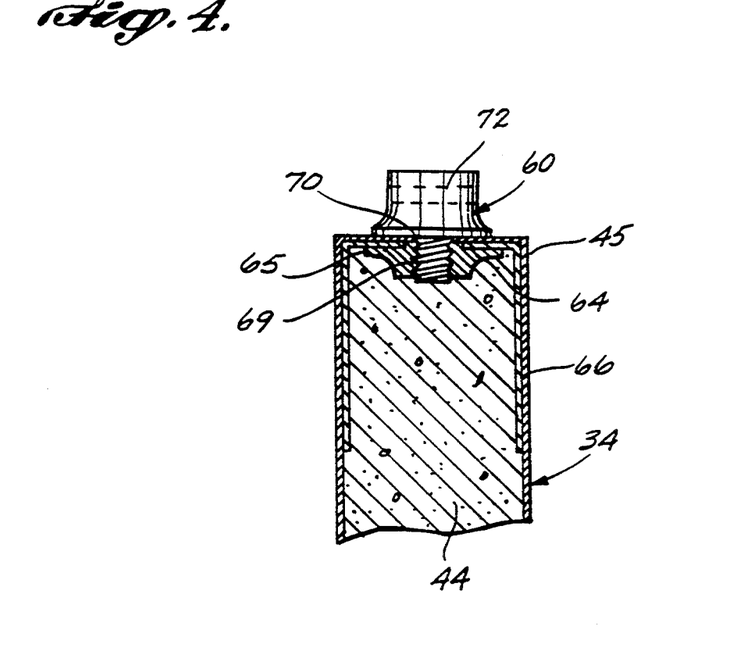
FIG. 4 is a partial sectional and cutaway view along cutting plane 4 indicated in FIG. 1, illustrating how the mounting stud is fixed to the center unit of the bicycle of this invention.

With reference to FIG. 1, the seat support 26 is in the form of an elevated beam that extends rearward from the top of the head unit 34 of the frame 12. One such seat support 26 that can be used with the bicycle 10 of this invention is disclosed in U.S. Pat. No. 4,934,724, which is owned by the assignee of this invention and incorporated herein by reference. The seat support 26 is attached to the head unit 34 by a forward mounting stud 60 and by a mounting bracket 62 located toward the rear of the head unit. As depicted by FIG. 4, the mounting stud 60 is held in position by a nut 64 and strap 66 located below the outer skin 45 of the head unit 34. The strap 66 is a three-sided structure and is formed of rigid metal approximately 25 mils. thick. The opposed upright legs of the strap are seated between the core 44 and outer skin 45 of the head unit. The nut 64 is seated underneath the top web of the strap 66. The nut 64 is formed with a top square-profiled flange 65 that is dimensioned to prevent 360° rotation of the nut. Mounting stud 60 has a threaded body 69 adapted to be inserted through a hole 70 formed in the center of the strap 66 and screwed into nut 64. A fin 72 extends upward from the body 69 of the stud 60. The fin 72 is formed with an opening designed to accommodate a fastening pin (not illustrated) used to secure the front portion of the seat support beam to the top of the head unit.

Mounting bracket 62, best seen in FIGS. 2 and 3, is a three-sided bracket, the center section of which is secured to the seat support beam. The opposed sides of the mounting bracket 62 extend over the opposite sides of the head unit 34. Each side of the bracket 62 is formed with a curved elongated slot 74. Mounting bracket 62 is locked into position, to establish the up-down angular orientation of seat support beam, by a fastener 76 that extends through the bracket slots 74 and the head unit 34. Specifically, the fastener 76 extends through a bore 78 formed in both the core and outer skin of the head unit 34. The fastener 76 is seated in a pair of sleeves 80 that are disposed in the bore 78. The outer skin of the head unit 34 adjacent bore 78 is formed with recesses 82 in which the flanges integral with the outer ends of the sleeves 80 and washers are seated.

Body units 36 and 38, as depicted by FIG. 2, in addition to serving as part of the structural frame of the bicycle, also define conduits for the cables that extend from the head unit to the derailleurs and the rear brake. Each body unit is formed with a first elongated bore 81, one shown, that extends from below the top of the body unit to the bottom of the body unit adjacent where the chain stay 22 is joined to the center section. Bores 81 function as the conduits through which the cables connecting the shifters to the derailleurs are housed. Right body unit 38 is further provided with a bore 83 that extends from below the top of the body unit to a point above the front derailleur and rear brake assembly. Bore 83 functions as the conduit in which the cable to the rear brake is housed. In some versions of the invention one, two, or all of the bores 81 and 83 may extend from the head unit 34 and into the body units 36 and 38. A sleeve 84 formed of rigid material may be seated in each of the bores 81 and 83 and serves as the actual conduit in which the cables therein are seated (one sleeve shown).

The bicycle crank assembly is coupled to a bottom bracket assembly 86 that is mounted in the bottom of the center section 39 of body units 36 and 38. Bottom bracket assembly 86 includes a sleeve 88 that is seated in bore 90 that extends through the cores and outer skins of the body units 36 and 38. Sleeve 88 is held in position by a pair of lock rings 92 that are fitted around the exposed ends of the sleeve. The outer skins of the body units 36 and 38 are shaped to define recesses 96 around the ends of the bore 90 in which the lock rings 92 are seated. The individual cranks of the crank assembly are connected through the bottom bracket assembly 86 by a conventional spindle and bearing assembly (not illustrated).

The rear wheel and rear derailleur are mounted to the bicycle frame by a pair of dropouts 104 that are attached to the ends of the chain stays 22. Each dropout 104 includes a base unit 106 that is seated in a recess 108 formed in the outer skin of the inside face of the associated chain stay 22. Dropouts 104 are dimensioned to closely fit in the recesses 108 so that the horizontal surfaces of the chain stay that define the recesses provide the support needed to vertically lock the dropouts in place. Threaded fasteners 110 that extend through the base units 106 of the dropouts 104 and the chain stays 22 hold the dropouts in the recesses 108. A stem section 112 extends rearward from each dropout base unit 106. Each dropout is further formed with a hook 114 at the end of the stem section 112 to which the axle assembly of the rear wheel is attached. The right-sided dropout may be formed with other openings, or even a cable guide, features not illustrated, to facilitate mounting the rear derailleur and the positioning of the associated shifter cable.

Figures 5, 6:
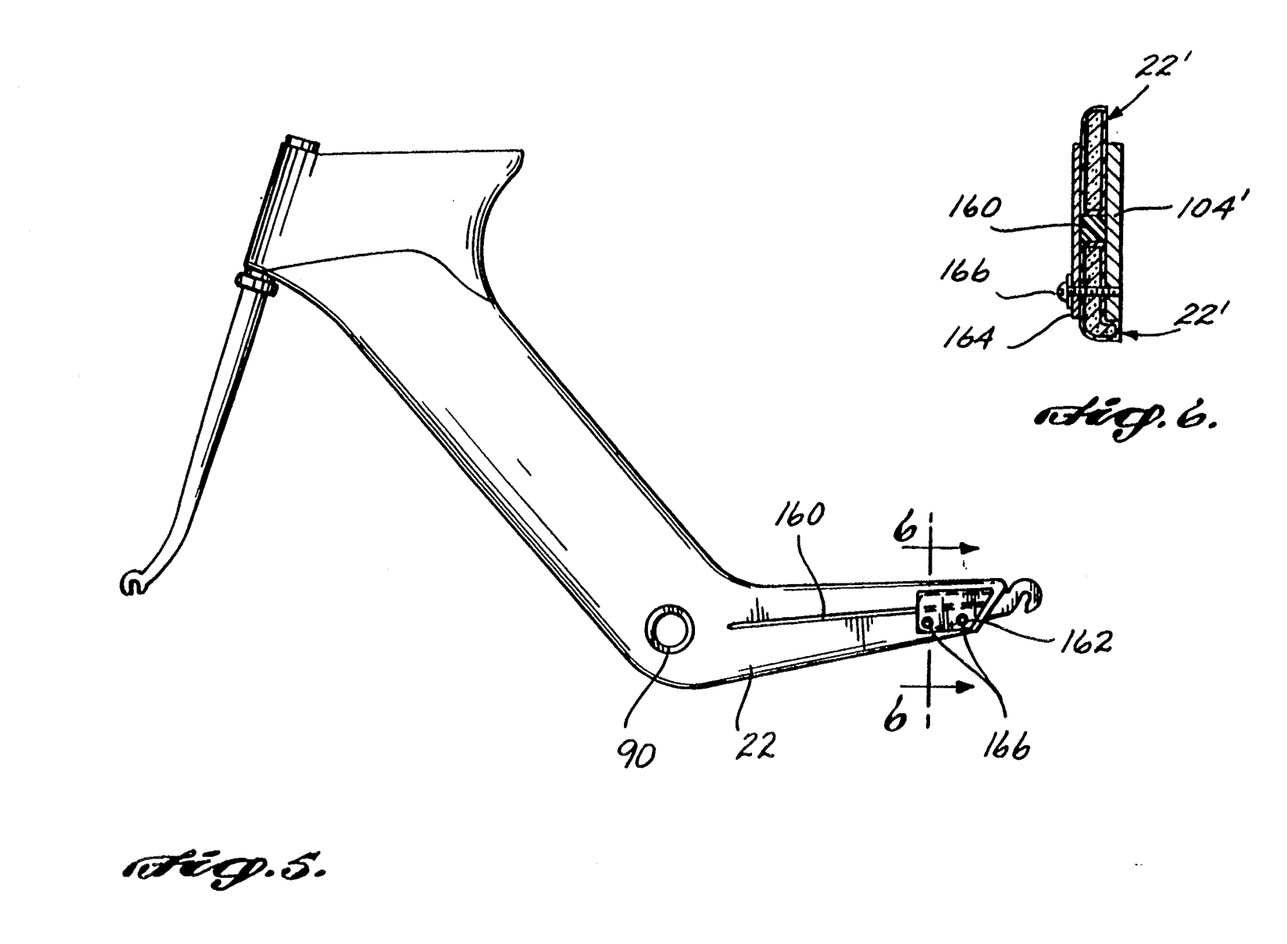
FIG. 5 is a side elevation of a modified frame in accordance with the present invention.
FIG. 6 is a partial vertical section along line 6—6 of FIG. 5.
Figure 14:
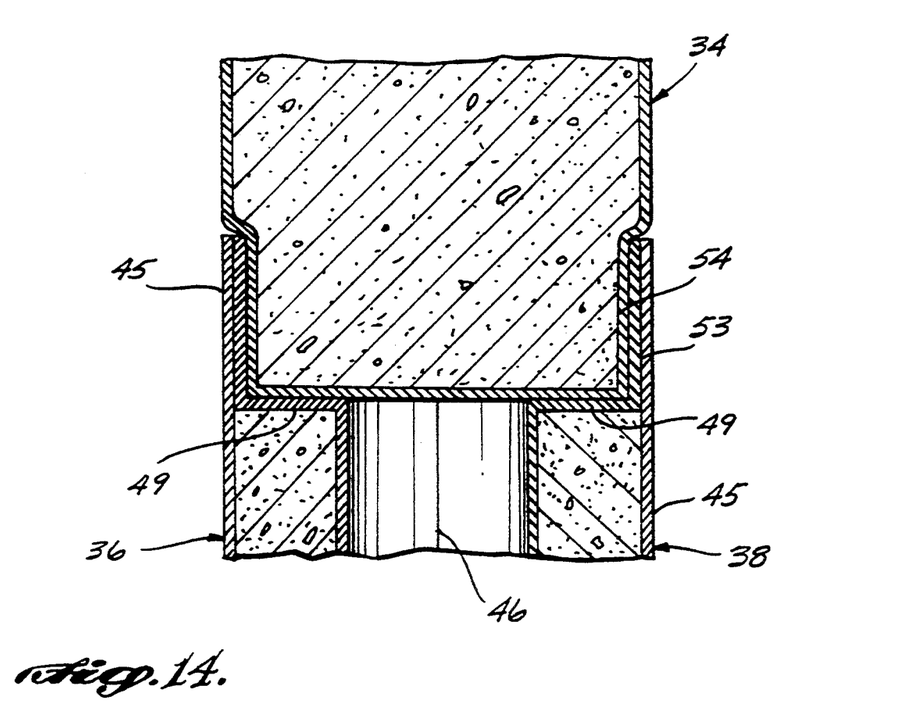
FIG. 14 (on the drawing sheet with FIG. 4) is a vertical section along cutting plane 14 indicated in FIG. 1, illustrating the joint between the head and body units of the frame of this invention.

In the modification illustrated in FIGS. 5 and 6, each modified chain stay 22' is formed with a generally horizontally extending elongated through slot 160 starting at a location closely adjacent to the crank bore 90 and extending all the way to the trailing edge 162 of the chain stay. Such slot bifurcates the stay 22' into top and bottom sections of approximately equal height. Preferably, the slot is filled with elastomeric material such as a resilient urethane. As best seen in FIG. 14, each dropout 104' also is modified such that its body or base portion extends from a location substantially below the slot 160 to a location substantially above the slot. On the exterior side of each stay 22', a guide plate 164 extends from a location below the slot 160 to a location a substantial distance above the slot. The guide plate 164 and associated dropout 104' are secured to the bottom bifurcation of the stay 22' such as by a pair of pin fasteners 166. The top bifurcation of the stay is not connected to the dropout 104' or the guide plate 160. Consequently, the top bifurcation of the chain stay is supported laterally such that it remains registered with the bottom bifurcation of the stay, but the top bifurcation is resiliently supported for shock absorbing movement toward and away from the bottom bifurcation of the stay. This provides some additional flexibility in the area of the bicycle crank for a smoother ride as the weight of the cyclist is applied to the pedals abruptly, particularly when the bicycle is ridden over uneven terrain.

The front derailleur and rear brake assembly 30, as represented by FIGS. 7-10 has a metal mount 116 that is secured between body units 36 and 38. Mount 116 is formed of a single piece and has a flat base section 118 that rests on and bridges the interface between the body units 36 and 38. A locking fin 120 extending downward from the base section stabilizes and holds the mount in position. The locking fin 120 is slightly offset from the longitudinal center axis of the base section 118 and is seated in a recess 122 formed in the right body unit 38. A top fin 124 extends upward from the base section 118. An arm 126 that is centered on the centerline of the bicycle 10 extends rearward from the top fin 124 and has a cross-sectional width slightly greater than that of the fin. A side-pull type brake 128 is mounted to the arm 126 to function as the rear brake of the bicycle. Brake 128 is secured to the arm 126 by a fastener 130 that extends through the arm 126 and the individual arms of the brake 128. Owing to the positioning of the mount 116 and the arm 126, brake 128 lies in a horizontal plane.

A front derailleur 134 is attached to the mount 116 by an adjustably positionable bracket 136. Bracket 136 has a first faceplate 138 that is disposed against the top fin 124 of the mount 116. Plate 138 is secured to the mount 116 by first and second fasteners 140 and 142, respectively. First fastener 140 extends through a circular bore 144 formed in the top of the top fin 124 and second fastener 142 extends through a slotted, arcuate opening 146 formed below bore 144. Bracket 136 includes a second faceplate 146 that extends perpendicularly away from the first faceplate 138 and that is located slightly above the first faceplate. The front derailleur 134 is mounted to the second faceplate 146 of the bracket 136. The front derailleur 134 includes a base unit 148 that is actually attached to the second faceplate 146 and a chain guide/shifter arm assembly 145 that is pivotally mounted to the base unit. A projection 143 of the derailleur base unit 148 connects to the upright faceplate 146 by a fastener (not shown) that extends through an elongated slot 149 formed in faceplate 146.

Figure 11:
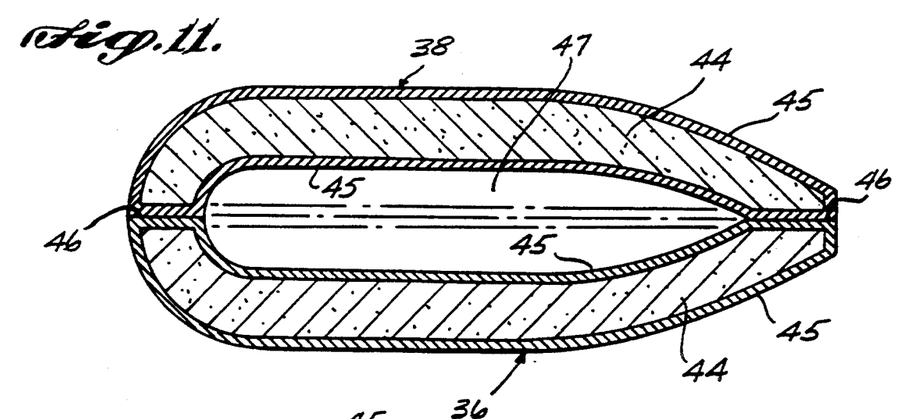
FIG. 11 is a section along cutting plane 11 indicated in FIG. 1.
Figure 12:
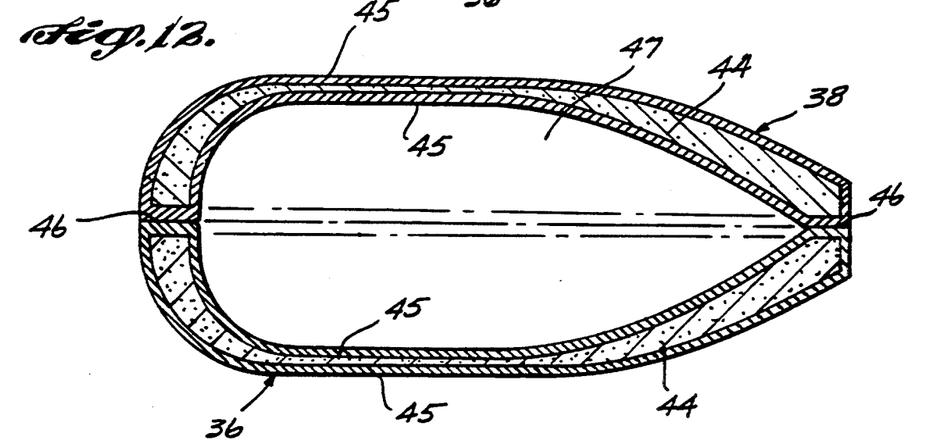
FIG. 12 is a section along cutting plane 12 indicated in FIG. 1.

With reference to FIG. 2, after the head unit 34 and body units 36 and 38 are fabricated, assembly of the bicycle proceeds with the mating of the body units. The right and left body units 36 and 38 are mirror images of each other. As best seen in FIGS. 11 and 12, preferably both body units are of generally C-shape in cross section with a foam core 44 encapsulated in a thinner outer skin 45. The facing surfaces 46 are planar at the leading and trailing edge portions of the body units for substantial contiguous engagement along the central vertical plane of the bicycle frame, leaving a substantial center void or cavity 47. Epoxy or other suitable adhesive is used to join the edge portions 46 to secure the body units together. Such joining edge portions form ribs along the leading and trailing edges of the inclined central portion of the frame.

Figure 13:
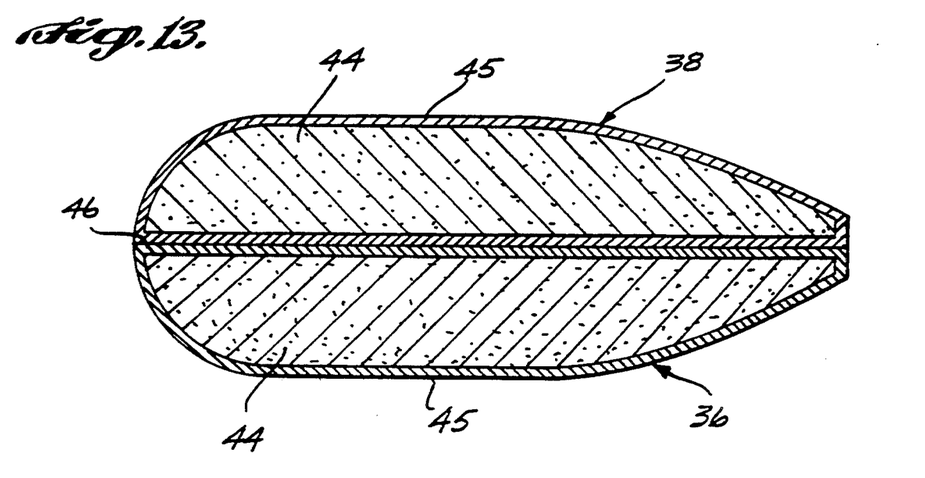
FIG. 13 is a section along cutting plane 13 indicated in FIG. 1.

The size of the central cavity 47 can vary along the length of the body portion of the frame. For example, as seen in FIG. 12 the walls of each body section 36 and 38 can taper in thickness from the upper portion of the body section toward the center of the body section such that the walls are substantially thinner at the center and the cavity 47 constitutes a greater portion of the enclosed area. From the central portion of the body section downward, preferably the walls increase in thickness to the area where the crank is mounted. As seen in FIG. 13, at such area the body units are of back-to-back D cross section with the facing surfaces 46 coplanar and contiguously engaged from their leading edges all the way to their trailing edges. While the frame having a hollowed out central and upper portion is preferred, the entire frame can have body units of D cross section meeting at the central vertical plane of the bicycle, as indicated in broken lines in FIGS. 11 and 12, for greater strength, but at the expense of greater weight.

With reference to FIG. 14, the top of each body unit 36 and 38 is formed with an upward facing shoulder 49. The top margin of each body unit has a peripheral flange 53 formed by a double thickness of the skin 45 and defining an upward opening socket. The head unit 34 of the frame is formed with a downward projecting tongue 54 for close fitting in the socket formed by the peripheral flanges 45 and of a length sufficient to engage against the upward facing shoulders 49. Epoxy or other suitable adhesive applied to the adjacent skins of the head unit 34 and the body units 36 and 38 secures the units together to form the composite bicycle frame.

Once the composite frame is assembled, the various bores are drilled through the frame so that the requisite sleeves may be positioned therein. Once the sleeves are attached to the frame 12, the remainder of the components are coupled to the frame to complete the assembly of the bicycle 10.

Figure 15:
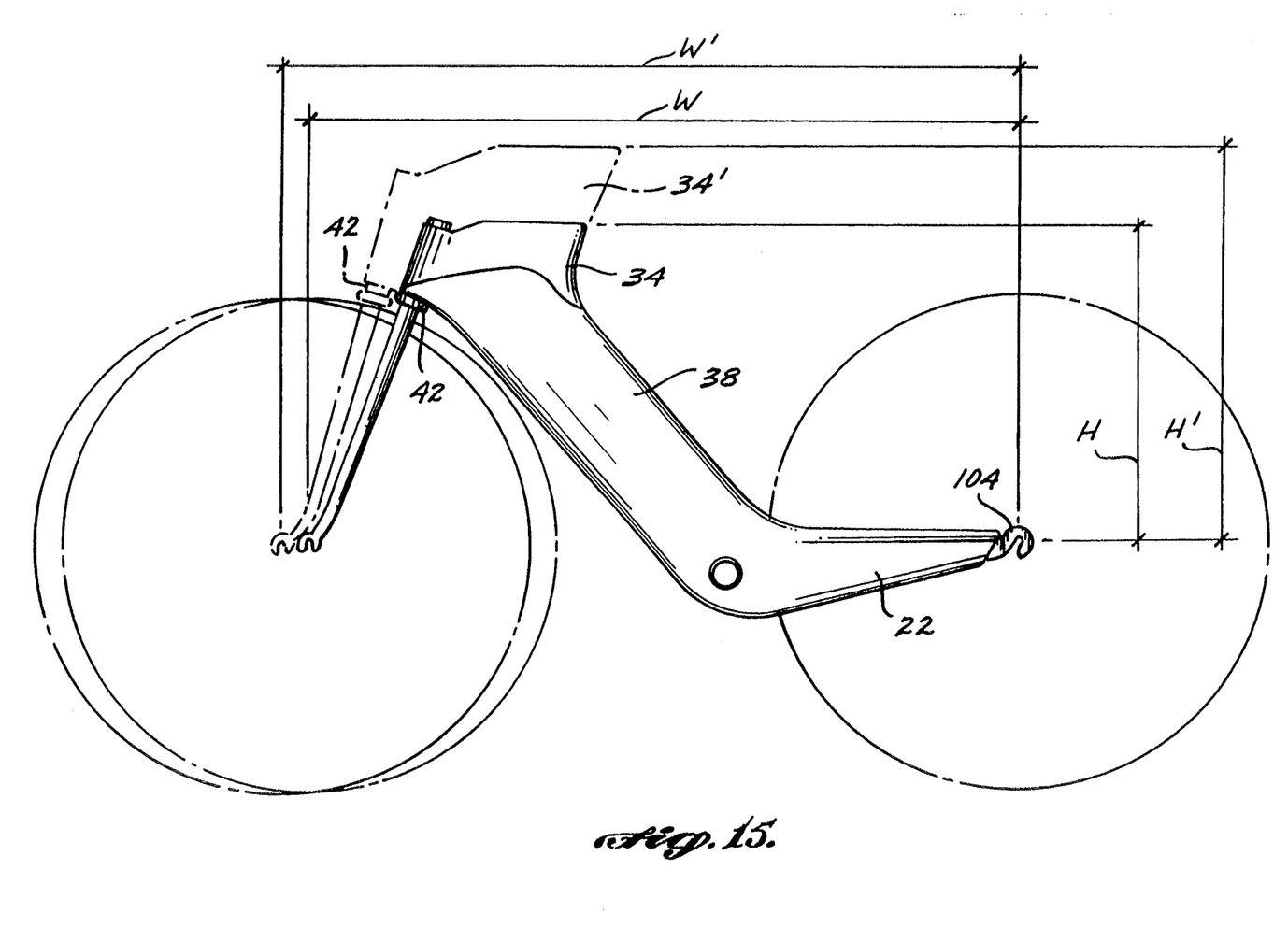
FIG. 15 is a somewhat diagrammatic side elevation of components of a bicycle having a frame in accordance with the present invention illustrating the change in geometry by use of different standardized modules.

The size and geometry of the bicycle frame can be changed by using body units or head units of different size but with identical interfitting components (i.e., tongues and sockets). FIG. 15 illustrates a representative change in geometry by using identical body units (the left unit 36 is visible) with different head units 34 and 34'. The tongues of the head units 34 and 34' are identical so that they will mate securely with the standardized body units. In a representative embodiment the height H, H' from the center of the rear wheel to the top of the head unit can vary between about 41 centimeters and about 52 centimeters by selecting an appropriately sized head unit module. Also, the modules can have different angles for the head tubes 42 resulting in a change in the wheel base W, W' such as from about 95 centimeters to about 99 centimeters. Also, dropouts 104 of different sizes can be secured to the chain stays 22 to accommodate wheels of different sizes. All of these variations in geometry are possible by substituting different sets of modular components in order to dimension the bicycle frame according to the stature of the cyclist.

Figure 7:
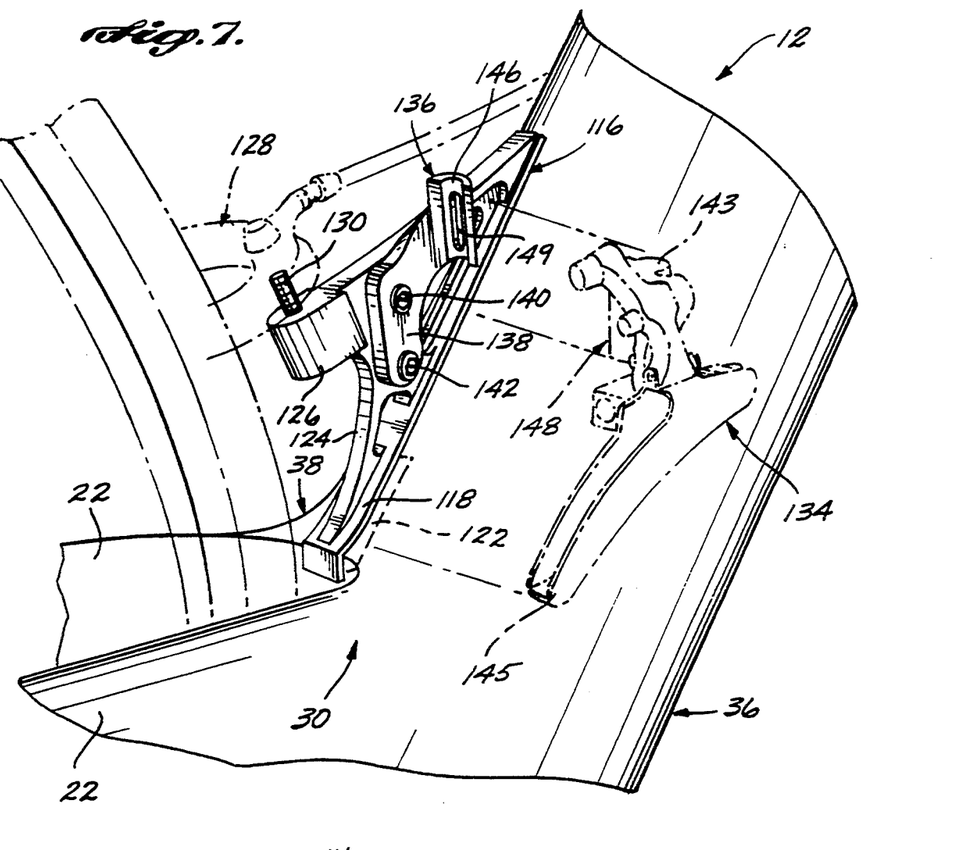
FIG. 7 is a perspective view of the front derailleur and brake assembly used with the frame of this invention, with parts broken away and parts shown in phantom.
Figure 8:
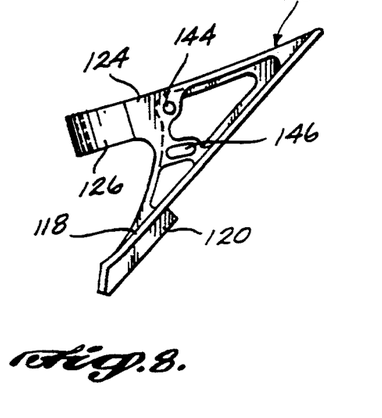
FIG. 8 is a side view of the front derailleur and rear brake assembly mount of FIG. 7.
Figure 9:
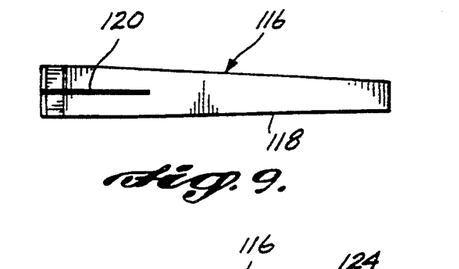
FIG. 9 is a bottom view of the front derailleur and rear brake assembly mount of FIG. 7.
Figure 10:
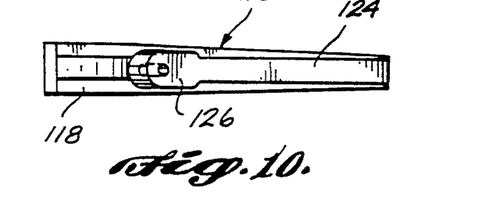
FIG. 10 is a top view of the front derailleur and rear brake assembly mount of FIG. 7.

With reference to FIG. 7, the design of the front derailleur and rear brake assembly 30 further enhances the ability to attach components of different sizes to the bicycle frame. Bracket 136 can be secured to mount 116 so that the front derailleur 134 has a selected angular orientation relative to vertical. The front derailleur 134 can be selectively secured to bracket 136 so that the derailleur is a selected vertical distance from the crank assembly. This adjustability makes it possible to install a single front derailleur and rear brake assembly 30 on the frame 12 that can be used to set the positions of the chains associated with differently sized drive trains. Thus, owing to the adjustability of the front derailleur and rear brake assembly 30 and the ability to install differently sized dropouts 104 to the chain stays 22, it is possible to construct frames 12 of this invention that can be configured to be used with differently sized bicycle wheels. For example, it is contemplated that a single bicycle frame 12 can be constructed to be used with wheels that are 26 inches, 27 inches, or 670 mm in diameter.

Still another advantage of the bicycle 10 of this invention is that the center rib or ribs formed when the body units 36 and 38 mate significantly increases the structural rigidity of a bicycle without significantly increasing its overall weight. Thus, the bicycle frame 12 of this invention has an overall weight of less than four pounds and yet is structurally as strong as tubular frames weighing significantly more. Furthermore, since this bicycle does not have the top tubes and seat posts that are associated with conventional bicycles, it is believed to offer less wind resistance than bicycles of earlier designs. The relatively long profiles of the center portions 39 of the body units 36 and 38 provide surfaces upon which advertising can readily be placed without depreciating the overall aerodynamic efficiency of the bicycle.

It will be understood that the foregoing description is for the purposes of illustration only. It will be readily recognized that bicycle 10 of this invention can be constructed out of alternative components and alternative materials other than those that have been described by way of example above. For example, in some preferred versions of the invention, instead of having two body units, it may be desirable to have a single body unit with which both chain stays are integral and in which the head unit is seated. In still other versions of the invention it may be desirable to construct the bicycle so the body units are seated in the head unit. Furthermore, it should be understood that other features and accessories can be added or removed from the bicycle. For example, it may be desirable to add a cage for a water bottle or a bracket for holding a pump. Alternatively, there may be versions of the invention for which it would be desirable to eliminate the bores in which the derailleur cables and brake cable are mounted and, instead, attach those components to the cable housings that are located outside of the frame 12. It should similarly be recognized that other seat supports may be used to provide structural linkage between the bicycle seat 28 and the frame 12. Therefore, it is an object of the appended claims to cover all such modifications and variations that come within the true spirit and scope of the invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A bicycle comprising:
    (a) a composite frame including a center section, a bottom bracket affixed to said center section, and at least one chain stay attached to said center section, said center section having a top side and a bottom side;
    (b) a rear brake attached to the top side of said center section of said frame adjacent said chain stay; and
    (c) a front derailleur attached to the top side of said center section of said frame adjacent said brake and above said bottom bracket.

2. The bicycle of claim 1, further comprising a mount for securing said rear brake and said front derailleur to the bicycle, said bicycle frame having a body unit forming said center section, said mount comprising:
    a base section attached to the top of said body unit adjacent said at least one chain stay; and
    an upward projection attached to said base section, said upward projection being coupled to said front derailleur, said upward projection also being coupled to said rear brake adjacent said front derailleur.

3. The apparatus of claim 2, further comprising a locking fin projecting downwardly from said base section within the body unit for stabilizing and holding said base section and said upward projection in position.

4. The apparatus of claim 2, wherein said upward projection comprises a fin extending upwardly in substantial alignment within a vertical plane defined by said frame of the bicycle.

5. The apparatus of claim 4, further comprising a bracket 136 movably coupled to said fin and attached to said front derailleur.

6. The apparatus of claim 5, wherein said bracket comprises a first faceplate coupled to said fin and a second faceplate attached to said first faceplate, said second faceplate being attached to said front derailleur, said second faceplate including an elongated slot for adjustable attachment of said front derailleur.

7. An apparatus for securing a rear brake assembly and a front derailleur assembly to a bicycle frame, the bicycle frame having a body unit and at least one chain stay extending rearwardly from the body unit, the apparatus comprising:
    (a) a base section arranged and configured for attachment to the body unit adjacent the chain stay; and
    (b) a mount projection attached to said base section, said mount projection including a means for mounting the front derailleur assembly and means for mounting the rear brake assembly adjacent the front derailleur assembly.

8. The apparatus of claim 7, further comprising a locking fin projecting outwardly from said base section and adapted to be inserted within the body unit for stabilizing and holding said base section and said mount projection in a fixed position.

9. The apparatus of claim 7, wherein said mount projection comprises a fin extending upwardly to be aligned substantially within a vertical plane defined by the frame of the bicycle.

10. The apparatus of claim 9, further comprising a bracket 136 movably coupled to said fin for attachment of the front derailleur assembly.

11. The apparatus of claim 10, wherein said bracket comprises a first faceplate coupled to said fin and a second faceplate attached to said first faceplate, said second faceplate being arranged and configured for attachment of the front derailleur assembly, said second faceplate including an elongated slot for adjustable attachment of the front derailleur assembly.

12. A mount assembly for securing a rear brake and a front derailleur to a bicycle having a frame, a bottom bracket, and at least one chain stay, the mount assembly comprising:
    (a) at least one mount attachable to the frame;
    (b) means for attaching the rear brake to said at least one mount above the bottom bracket adjacent the chain stay; and (c) means for attaching the front derailleur to said at least one mount above the bottom bracket adjacent the rear brake.

13. The mount assembly of claim 12, wherein said at least one mount comprises one upwardly extending fin arranged and configured for attachment to the frame above the bottom bracket.

14. A front derailleur/rear brake assembly for a bicycle comprising: a mount adapted to be attached to the bicycle, a front derailleur pivotally attached to said mount, and a rear brake attached to said mount.

15. The front derailleur/rear brake assembly of claim 14, wherein said mount includes a base member for attachment to a surface of the bicycle, a fin extending from said base member in a direction away from the surface of the bicycle to which the base member is attached, and an arm attached to said fin, wherein said front derailleur is mounted to said fin and said rear brake is mounted to said arm.

* * * * *